United States Patent
Xie et al.

(10) Patent No.: US 11,963,068 B2
(45) Date of Patent: *Apr. 16, 2024

(54) SYSTEM AND METHOD FOR VERIFIABLY PROVING PROXIMITY

(71) Applicant: Guardtime SA, Lausanne (CH)

(72) Inventors: Michael Xie, Hacienda Heights, CA (US); Hema Krishnamurthy, Phoenix, AZ (US)

(73) Assignee: Guardtime SA, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,892

(22) Filed: Oct. 18, 2022

(65) Prior Publication Data
US 2023/0037761 A1 Feb. 9, 2023

Related U.S. Application Data

(63) Continuation of application No. 16/921,651, filed on Jul. 6, 2020, now Pat. No. 11,477,611.

(51) Int. Cl.
*H04W 4/029* (2018.01)
*H04L 9/06* (2006.01)
*H04L 9/32* (2006.01)
*H04L 9/40* (2022.01)
*H04W 12/06* (2021.01)
*H04W 64/00* (2009.01)

(52) U.S. Cl.
CPC ........... *H04W 4/029* (2018.02); *H04L 9/0643* (2013.01); *H04L 9/3247* (2013.01); *H04L 63/0807* (2013.01); *H04W 12/06* (2013.01); *H04W 64/003* (2013.01)

(58) Field of Classification Search
CPC ... H04W 12/06; H04W 4/029; H04W 64/003; H04L 63/0807; H04L 9/0643; H04L 9/3247
USPC ....... 370/328, 252, 521, 230, 329, 311, 235, 370/254, 255
See application file for complete search history.

(56) References Cited

U.S. PATENT DOCUMENTS

| | | | |
|---|---|---|---|
| 7,323,991 B1* | 1/2008 | Eckert | G07C 9/28 235/382 |
| 2010/0093429 A1* | 4/2010 | Mattice | G07F 17/3232 463/25 |
| 2015/0189068 A1* | 7/2015 | Mohan | H05B 47/105 455/420 |
| 2015/0213660 A1* | 7/2015 | Bergdale | G07C 9/21 340/5.61 |

(Continued)

*Primary Examiner* — Joseph Arevalo
(74) *Attorney, Agent, or Firm* — Jeffrey Pearce

(57) ABSTRACT

When a mobile device such as a smart phone comes within range of a location device, the mobile device inputs a location token from the location device and a travel token is created from a mobile device token and the location token. The mobile and location tokens may include data elements indicating not only identity, but also such other characteristics as an authorization or infection risk level. Tokens may be digitally signed, preferably with an independently verifiable signature that also encodes time. Mobile and location devices may be created and issued by a tracking service provider, which may also store tokens, analyze travel tokens with respect to a location's risk level, and update mobile device and location tokens to change a status of the mobile or location device.

18 Claims, 4 Drawing Sheets

(56) References Cited

U.S. PATENT DOCUMENTS

2016/0232515 A1* 8/2016 Jhas .................... G06Q 20/3278
2018/0060989 A1* 3/2018 Hietanen ................ G06Q 30/04
2022/0007141 A1* 1/2022 Xie ..................... H04L 63/0807

* cited by examiner

SYSTEM AND METHOD FOR VERIFIABLY PROVING PROXIMITY

CROSS-REFERENCE TO RELATED APPLICATIONS

This application is a continuation of and claims priority of co-pending U.S. patent application Ser. No. 16/921,651, filed 6 Jul. 2020, which will issue as U.S. Pat. No. 11,477,611 on 18 Oct. 2022.

TECHNICAL FIELD

This invention relates to structures and processing of data enabling verifiable evidence that two devices were in proximity of each other.

BACKGROUND

"Where were you on the night of _____?" is a question familiar around the world to every reader or viewer of crime thrillers. Proving or at least having some form of verifiable evidence of one's location, or of the location of some device or system, is often required, however, in real-life situations as well. For example, professionals and students may need to be able to document attendance at mandatory educational seminars; individuals may have mandatory in-person reporting requirements with officials; in the context of the spring and summer of 2020, individuals may need to be able to show proof that they have gone to an allowed place such as a pharmacy or medical facility and perhaps also to show proof of viral test results, or that they have been in a location that may increase their risk of infection; etc.

Most existing solution for location-verification rely on position-fixing systems of varying precision such as GPS or mobile phone towers. One obvious disadvantage of these systems is that they will not work unless the device being used is able to acquire the necessary number of sufficiently strong signals. Another problem is that of privacy: Many proposals to track, for example, those actually or potentially infected with the Covid-19 virus involve sometimes involuntary, automated tracking and data accumulation by a central authority of the movements of individuals. Such systems are also typically unsuitable for scenarios in which an individual needs to prove, for example, having met another individual, having been somewhere better indicated by identity than by geographic coordinates, or other information besides or in additional to just proximity.

In some cases, the goal is to establish proximity of a user device to some other fixed or mobile short-range transmitting device using, for example, Bluetooth or NFC (Near Field Communication) technology. If the location of the transmitting device is known, then these systems may establish both proximity and location of the user.

Many of these prior art systems operate in a kind of "top down", "command" environment, with various mechanisms to compel compliance, often by force of law. Not only do these systems raise such issues, but they are also inflexible and designed primarily for a single purpose, such as tracking virus infection. In some scenarios, for example, it is the users themselves that are the ones who want proof of location and/or proximity, in particular in a portable form, and not necessarily for virus infection tracking.

In some prior art systems, an arrangement based on public/private key pairs (such as in the public key infrastructure PKI) is used either to identify parties in an information exchange, to provide a level of verifiability and security for the information being exchanged, or both. This reliance on keys is often inconvenient, since it requires trusting a certificate authority that issues the public/private keys, storing the keys, and making sure they haven't expired.

DETAILED DESCRIPTION

Different embodiments of this invention use token-based procedures with data structures that may be used to verify that a mobile device has been at or near some other location entity. The mobile device may be a device such as a smartphone, tablet, etc., associated with a human user, or it could be a device that is part of or is otherwise associated with some object. The location entity may be any device that is capable of exchanging data with the movable entity.

The concept of "location" as used here is not necessarily restricted to geographic position, but rather may be a logical position such as proximity to a system with a particular IP or MAC address, or a location relative to some other entity, such as within reception and transmission range of a technology such as Bluetooth, NFC, etc.

In the general context of data security, a "token" is a data element that is mapped to and is used as a substitute for some other data, usually to maintain the secrecy of the original data. The tokens used in various embodiments here may be of this type, or may be unique data elements generated by one entity and submitted to another without any pre-mapping to any other data element.

Main Entities

Figure 1:
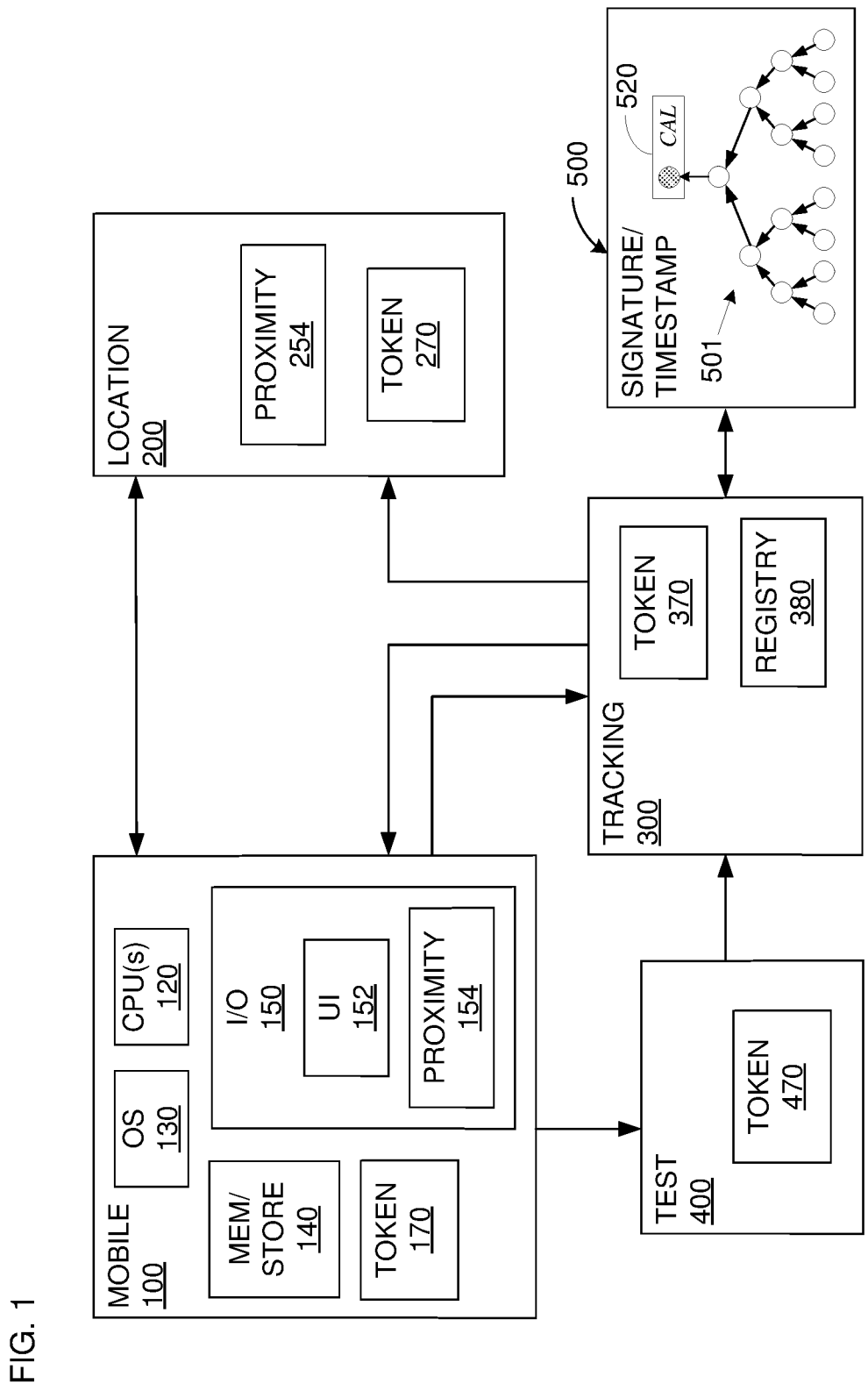
FIG. 1 illustrates various systems that are used in different embodiments.

FIG. 1 illustrates the main entities that take part in embodiments of the invention. In some embodiments, not all of these entities are needed, as will be explained.

A mobile device 100 forms the primary interface with other components, at least from the perspective of the entity whose location is to be made verifiable. In many cases, this entity will be a human user, but this is not necessary. For example, the "user" could be a vehicle that has a module with the components necessary to operate as described below for any other mobile device, an item in a supply chain that is similarly attached to or otherwise associated with a suitable module, etc. For the sake of simplicity, the description below will focus on a human user for whom the mobile device 100 is a device such as a smart phone, a smart watch, a tablet or other portable computing device, etc.

As FIG. 1 illustrates, each mobile device 100 will generally include one or more processors 120, system software 130 such as an operating system, as well as some combination of memory and non-volatile storage 140. The system software 130 may include drivers as needed, for example, to interact with peripheral devices. Applications may run on the hardware under the control of the system software; the procedures described below will in general be carried out by software modules or components running at the user/application level and can thus be viewed as "applications". Similar hardware and software components will typically be found in the other entities shown in FIG. 1, but are not illustrated separately for the sake of simplicity. The system software, as well as applications, including the specialized modules described below, will be embodied as processor-executable code that is usually embodied in non-volatile storage and is then loaded as needed into memory for execution by the processor(s). The code itself may be pre-loaded, downloaded from an external source, input from a portable storage medium such as a disk, thumb drive, etc. In some implementations, it would also be possible for some or all of the code execution to be done remotely, such as would be the case with cloud computing.

One or more I/O units 150 include software and hardware components to receive and transmit information to other entities. For human users, this will generally include a user interface (UI) 152 such as a touch screen or other form of display and input such as a keypad. A proximity-detecting component 154 is included either as part of the broader I/O arrangement 150, or as a separate component within the mobile device 100. Examples of proximity-detecting components include wireless technologies such as Bluetooth, Near-Field Communication (NFC) devices, a camera with an associated image- or code-interpretation software module for recognition of codes (such as a QR or bar code). Embodiments might also sense proximity using a wired arrangement, in which the mobile device, using a conventional network cable or contact cradle, etc., is plugged into another entity for the exchange of information.

The mobile device 100 also includes a token processing software component/module 170, which also provides for storing received tokens in the memory/storage 140 of the device. The token processing software component/module 170, as well as the code necessary to interact with, for example, the proximity module 154, the UI 152, and other hardware and software components in the mobile device may be provided in the form of an application that may be installed in the mobile device 100 in any conventional manner.

The context of embodiments of the invention is the desire to make it possible to create proof that the mobile device 100 (and thus, in most cases, whatever entity, human or otherwise) was at a location. In embodiments here, "location" is associated with a location device 200, which may be any computing or other system able to sense the proximity of and exchange information, in particular, tokens, with the mobile device 100. In addition to conventional system hardware and software, the location device 200 therefore includes a proximity-detecting module 254 and a token-processing software component/module 270 to interact with the corresponding components in the mobile device 100.

In the illustrated embodiment, a tracking service provider 300 is shown as a separate computing system whose tasks include creating, processing and managing various tokens, using, for example, a corresponding software component 370, as well as other optional services such as analytics. The tracking service provider serves as the "administrator" of the system and preferably maintains a registry 380 in which to store tokens it owns (and, preferably at least references to tokens it has owned) and data indicating with which entity each token is associated.

There may be more than one tracking service provider, each of which administers the tokens it currently owns. Different tracking service providers may be provided to manage tokens and related operations for different geographic, administrative, or logical areas, in which case ownership and responsibility for tokens may be transferred from one tracking service provider to another as needed.

Examples of tracking service providers include governmental authorities or agents, enterprise headquarter servers, etc. The tracking service provider 300 will include conventional components to enable it to communicate data with other entities in the system such as the mobile device 100 and location system 200. In most embodiments, communication between tracking service provider 300 and other devices/systems will be over either a publicly available (such as the Internet) or private network. In some other embodiments, however, the location device 200 and the tracking service provider 300 systems could be combined into one, in particular in situations where there is only one location that users will need to "check in" with.

In some implementations, the purpose of the system will include enabling testing of some characteristic of the user. For example, whether the user has or is at risk of contracting a disease may be relevant to an implementation of the invention, in which case a testing entity 400 may be included. This entity may include its own token-processing software component/module 470, especially to process device tokens and corresponding test tokens, which are explained below. As needed, it may also include a proximity sensing module, or at least some conventional mechanism to communicate with and transfer data.

Digital signatures are used in preferred embodiments. As FIG. 1 illustrates, other entities in the overall system may obtain such signatures from a source such as the signature system 500, with which they communicate in whatever manner the chosen signature system requires. Although any conventional signature system may be used, the KSI signature infrastructure described below is particularly advantageous since, among other reasons, its signatures also function as irrefutable timestamps, it does not require trust in a certificate authority, and it does not require storage of usually time-limited public/private key pairs.

As mentioned above, embodiments may be used to verify that the mobile device 100 has been at the location where the location system 200 is, without being dependent on external geopositioning technologies such as GPS, cell phone tower signals, etc. A few of the essentially countless use cases are mentioned above, of which some presume more information interchange than others. The tracking of infections or some other form of contamination or exposure to a dangerous substance in a population provides a usefully complicated example, however, so embodiments are described below primarily to such an implementation. It is well within the skill of computer system designers to know how to modify (usually, simplify) the illustrated embodiment to adapt it to other implementations.

Identifiers

Mobile devices and location devices will in general need to be associated with unique identifiers; this may also apply to other entities in the system. Identifiers may be internally generated, or assigned by an administrative entity (such as the tracking service provider). Mobile telephones, for example, might use their phone numbers (which the mobile network will generally automatically transmit to recipients), or their International Mobile Equipment Identity (IMEI), or a user-chosen ID, etc., or a combination. To increase privacy, only a repeatable function (such as hash) of this information could be transmitted. If the repeatable function is chosen to be a KSI signature (see below), or a reduced version of it (such as a hash of the signature, or a subset of the bits of the signature or of the corresponding calendar or publication value (again, see below) then the identifier will also be both fully anonymized and timestamped with a single data structure or even single value.

Another option for avoiding compromise of anonymity through leakage of ID information would be for an administrative entity (such as a tracking service provider or some other central entity) to store hashed identifiers in a data structure such as a Bloom filter, which would enable other devices to check whether the hash is present in a "proximity list", for example, in the registry 380, without associating the identifier with a particular device or individual.

Proximity Sensing

Different mechanisms—both manual and automatic—may be used to enable then mobile device 100 and the location device 200 are in the proximity of each other, that is, close enough to sense each other and exchange information. In some embodiments, wireless technologies may be used. For example, using Bluetooth, the user could pair the mobile device 100 with the location device 200, which would be possible only if the two devices are within reception range of each other; NFC technology could be similarly employed. Subsequent connections could then be made without specific user action if the mobile device 100 is set for automatic reconnection.

In other embodiments, other user action could be required. For example, the location device 200 could display an optically (or otherwise) readable code, such as a QR or bar code, which could then be used either to directly convey information, or a link to an online site that is then used as a portal for communicating data between the mobile and location devices. The proximity sensing component in the mobile device could in such cases include the mobile device's camera, or at least be able to receive and interpret images from the camera.

In still other embodiments, in which the concept of "location" is logical, "proximity" could mean "connection" in the sense of the application in the mobile device, via its native smart technology, being logged into or otherwise in communication with the location device, in which case data such as the mobile device's IP or MAC address, its IMEI (if the device is a smart phone) as well as conventional log-in procedures such as entering an ID and password, may be used to identify the mobile device and/or user.

In still other embodiments, detecting the proximity of the mobile device at the location device could involve the user physically attaching the one to the other, such as by using a cable to plug the mobile device into the location device, or vice versa, by setting the mobile device in a cradle that is connected to the location device, etc.

Digital Signatures

Digital signatures are used in some steps of the embodiments described below. Embodiments of this invention do not require any specific structure for digital signatures, or form of signature service, but a particularly advantageous service is the data signature infrastructure developed and marketed under the name "KSI" by Guardtime AS of Tallinn, Estonia. This system is described in general in U.S. Pat. No. 8,719,576 (also Buldas, et al., "Document verification with distributed calendar infrastructure"), and, for the sake of succinctness, a signature obtained using this infrastructure is referred to herein as a "KSI signature". In summary, for each of a sequence of calendar periods (also referred to as "rounds", or "aggregation rounds", which are typically related one-to-one with physical time units, such as one second), the Guardtime infrastructure takes digital input records as inputs, that is, lowest-level tree "leaves". These are then cryptographically hashed together in an iterative, preferably (but not necessarily) binary hash tree 501 (FIG. 1), ultimately yielding an uppermost root hash value (a "calendar value") that encodes information in all the input records. This uppermost hash value is then entered into a "calendar" 520 (FIG. 1), which is structured as a form of a type of blockchain which, in some implementations, may involve aggregating calendar values into a progressive hash tree. The KSI system then returns a signature in the form of a vector, including, among other data, the values of sibling nodes in the hash tree that enable recomputation of the respective calendar value if a purported copy of the corresponding original input record is in fact identical to the original input record.

Note that no signature is returned to any input entity until all inputs have been received for a given calendar period. This is because, until all inputs are received, it is not possible to compute the root hash value. One consequence of this is that, once a signature has been returned for an input, it is too late to attempt to get another signature for the same (or any other) input value in the same calendar period.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time when the block was created. In other words, a KSI signature also acts as an irrefutable timestamp, since the signature itself encodes time to within the precision of the calendar period.

One other advantage of using a Guardtime infrastructure is that there is no need to store and maintain public/private (such as PKI) key pairs—the Guardtime system may be configured to be totally keyless except possibly for the purposes of identifying users or as temporary measures in some implementations in which calendar values are themselves combined in a hash tree structure into a publication value that is stored in any chosen, essentially immutable medium such as a widely distributed newspaper or web site, a publicly trackable database, a separate blockchain, or a similar medium under the control of an authoritative entity such as a government agency or enterprise administrator. This means in turn that, at least for the purpose of digitally signing data, the user of the KSI system does not need to obtain a digital certificate or communicate with and trust some certificate authority to generate keys, which may expire.

Another advantage is less apparent: Given the signature vector for a current, user-presented data record and knowledge of the hash function used in the hash tree, and the calendar or publication value corresponding to a signature time, an entity will be able to verify (through hash computations as indicated by the signature vector) that a "candidate" record is correct even without having to access the signature/timestamping system at all. In implementations in which calendar values are combined or individually formed into a publication value, vector returned as a digital signature may then be extended with additional elements to enable recomputation beyond the corresponding calendar value to the publication value.

Yet another advantage of the Guardtime infrastructure is that the digital input records that are submitted to the infrastructure for signature/timestamping do not need to be the "raw" data; rather, in most implementations, the raw data is optionally combined with any other desired input information (such as user ID, system information, various metadata, etc.) and then hashed. Given the nature of cryptographic hash functions, what gets input into the KSI infrastructure, and thus ultimately into the calendar blockchain, cannot be reconstructed from the hash, or from what is entered into the calendar blockchain.

Tokens

In embodiments of the invention, tokens are "owned" by different entities. Here, "ownership" implies the ability to modify or transfer the data the token contents, and, in some embodiments, initially create them. Token ownership may be indicated and enforced in different ways. For example, the identity of the owner, or some value that encodes this identity, may be included as a data element in the token, for example in the form of a PKI key or KSI signature that encodes, for example, an ID element and possibly other data unique to the current token owner and occurrence, such as a timestamp. As mentioned above, some of the advantages of using the KSI infrastructure are that the signatures, which may function like certificates, enable independent verification of the time of signature as well as the input data, which may include not only the data in the token's data structure and an identifier of the device holding the token, but also, for example, as desired, other information such as the identifier of the entity (such as a tracking service provider) that created the token and time of token creation.

By entering suitable information into the data structure corresponding to a token, one or more tokens or token types may selectively also include and be subject to different control parameters, such as being time-limited, that is, caused to become invalid after some absolute or relative time (for example, creation-expiration time), such as a set end time or the expiration of a quarantine period. This would have the side benefit that location tokens, that is, indications of where a user has been, may be rendered unreadable if the user's phone is lost.

The time of expiration may be tracked in different ways. One way is to enter the expiration time of each token in its record in the registry 380, which will make it easy to determine if a submitted device or location token (see below) is valid at the time of submission. Another way would be to compare the timestamp encoded in the KSI signature of a token (assuming the KSI signature infrastructure is used) with the submission time; note that this would also enable an entity to determine how long it has been since the token was created and/or most recently updated.

An example of another token control parameter is one or more values, such as a flag or list, restricting how often, within which time, or to which entity or entities the respective token may be transferred, if at all.

In one embodiment (using tracking of infection as an example), four different types of tokens are processed by the different entities shown in FIG. 1. In this embodiment, four types of tokens are used, some of which may be needed in other implementations. These four types of tokens are 1) device; 2) location; 3) travel; and 4) test. In some implementations, not all of these tokens may be required, and in some others, some of the tokens could be combined.

Device Token

The device token may be created, issued to the mobile device 100, and managed by the tracking service provider 300, but is initiated by the mobile device itself, for example, by the token processing software module 170, and enables the mobile device to indicate current status and to interact with other tokens. The mobile device 100 itself preferably is not enabled to modify the received device token; rather, preferably, only the tracking service provider 300 is authorized to modify (such as update) the device token. The device token is a data structure that includes data elements that indicate whatever states, status indications (such as risk level, authorization level, etc.), associations, metadata, etc. that the system designer deems necessary or desirable in a given implementation.

For example, in the case of tracking infection, the device token may include data corresponding to a status such as a measure of current infection risk and of the history for the device owner. Risk could be indicated in a numerical range, or by categories such as High, Medium, Low, each associated with levels of permission such as:

High: possible or confirmed infection, quarantine or reporting required

Medium: possible exposure to infection due to proximity in time and location to others known to be infected Low: no exposure indicated Other information that might be included in a device token is a contact list, for example, of people in the user's social, workplace, or personal network. If authorized (for example with user consent), the mobile device's token-processing component 170 could access and input such contact information, using known methods, from other applications within the mobile device. This would enables social circle-based analytics.

Location Token

A location token is a data structure that contains information relating to the location corresponding to the location device 200, and or to the location device 200 itself. The location token will include data that uniquely identifies it. As with other tokens, this might be a key, a hardware-defined or software-generated identifier of the location device, or a data element generated per-instance in a random fashion, as long as it is stored for later reference. Location tokens are also created and managed by tracking service provider 300, but are applied by whoever or whichever entity is in control of the location device, via the respective location device 200, that is, they may be communicated to other entities.

In the context of infection tracking, the location token for a location may include such information as the infection and sanitation history of the location, such as a restaurant, train compartment, bus station, hospital ward, reception area of an office, etc. Location tokens might also, or instead, indicate levels of authorization to perform one or more actions, an indication of some other type of status, a time or index relating to expiration time or use number, etc., as well as a digital signature. In implementations that involve tracking of infection risks, the tracking service provider may determine the status of location devices according to results of tests of users whose mobile devices have been in proximity of the location devices. As this changes, the tracking service provider may then send to those location devices whose status has changed updated location tokens, especially in embodiments in which users themselves, via their respective mobile devices, track their risk levels; alternatively, the tracking service provider may simply note the status of each location in the corresponding entry in the registry for the respective location token.

Again, by using a signature generated using the KSI infrastructure, as long as they know the calendar or publication value corresponding to the time of signature, other entities may verify the signed data in the token independently. KSI can be used to timestamp the tokens not just to provide integrity but also to establish a time sequence of which token was in which location.

Embodiments of the invention can work even if a location is not stationary. For example, the location device itself could be mobile, as long as it is able to transmit its location token to mobile devices. In some cases, it is enough to prove that a mobile device has been in the proximity of even a non-stationary location device. In other cases, even with a non-stationary location device, the actual physical location at which the two devices interact is important. In those cases, the current physical position of the location device may be established in any conventional manner, such as through GPS coordinates, cell phone tower triangulation, etc. U.S. Pat. No. 9,473,510, issued 18 Oct. 2016 ("System and method for location verification") discloses a system in which the KSI signature infrastructure is used to provide a verifiable and difficult-to-bypass system to associate data with the physical geolocation of a mobile device, and which may be used in embodiments of this invention.

A location need also not be "distant". For example, a location device might be in the home of a user, who needs to prove, for example, periodically, that he was home at specific times or intervals. Some authority could, for example, periodically send a signal (such as a text message) to the user's smart phone indicating a requirement to "check in" with the home location device by creating a new "travel" token (see below) showing that he is home. Such authority-prompted requirement or suggestion to connect with a location device and create a travel token may be implemented in other circumstances as well, regardless of the user's location. Depending on the proximity-sensing technology chosen, it would also be possible to enable automatic communication and token transfer when a mobile device comes within reception and/or transmission range of a location device.

The location token may also indicate such location characteristics as a risk level such as in a numerical range, or by categories such as High risk: Visited by a known infected or high risk individual in the past X hours Medium risk: No known infected or high risk individual visit in the past X hours, but last known sanitation was Y hours ago Low risk: No known infected or high risk individual visit in the past X hours, or last known sanitation happened within Y hours Travel Token The mobile device 100, that is, the software (application) loaded into the mobile device to carry out the operations described herein, when the mobile device senses that it is in the proximity of the location device, such that the mobile device has access to both a device token and a corresponding location token. Although automatic operation may be implemented, in implementations that include a requirement for user consent, a request by the mobile device to receive a travel token preferably occurs only when the user takes some corresponding specific action such as selecting a "submit" icon or button or the like. The tracking service provider 300 may process and analyze travel tokens and relate them to incidents, such as that location XYZ had recent exposure to known infected individual A, putting at risk individuals B and C, who were in the same location for the past X hours.

Test Token

Not all implementations will involve testing, but for those that do, test tokens may be used. A test token is a data structure that includes whatever information the testing entity wishes to keep track of. A test token is owned by a corresponding testing entity 400 and may be shared with the tracking service provider for analytics. In the context of disease tracking, the a test token may include such information as:

Time of the test
Testing entity ID (through token signer)
Related device token
Results of the test (negative, positive)

Testing entities 400 may implement procedures to prioritize tests, for example, based on device token current status and provenance of previous test results.

Device Token Creation

Figure 2:
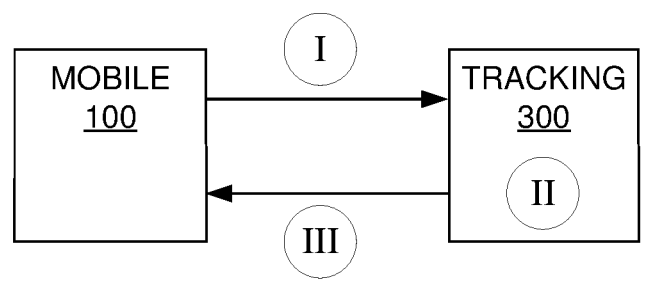
FIGS. 2, 3, 4, and 5 illustrate the creation and submission of device tokens, location tokens, travel tokens, and test tokens, respectively.

FIG. 2 is an operational illustration of how a device token may be created. showing phases I-III:

I. The mobile device 100 initializes device token creation by connecting in any conventional manner, such as through the Internet, with the tracking service provider 300, or it is pre-provisioned. The mobile device then requests registration of itself with the tracking service provider, and issuance of a corresponding new device token.

This request will include some form of identifier of the mobile device, such as its phone number, IMEI, etc., as well as a request for generation of any keys being used, or, preferably, a KSI credential, such as a KSI signature of the information being submitted, which may be or include a travel token. In some implementations, it may be undesirable to include the "raw" identifier (such as phone number) of the mobile device in the device token, since it later may be exchanged with entities other than the tracking service provider. It may then be preferable to use not a "raw" phone number, but rather a hash or some other repeatable transformation of the number, which thereby ensures privacy and anonymity. Recall that one advantage of using the KSI infrastructure to form signatures is that the raw phone number would not be required for the signature (its hash or other transformation is acceptable), yet the signature can later still be verifiable: the hash of the raw phone number is itself easily verifiable, and then the signature as a whole can be verified. If there is a need to reduce storage requirements for device tokens, it would be possible, for example, to truncate hash values and use them as token identifiers.

II. Using any conventional method, such as sensing the phone number or network address, the tracking service provider verifies the mobile device and then creates and activates the requested device token and associates it (for example, in the registry 380) with the requesting mobile device's identifier. Depending on the implementation, the tracking service provider may also include in or at least associate with the token an initial "score", such as risk or authorization level. In short, the tracking service provider creates the data structure corresponding to the device token and preferably signs it (such as with a KSI signature, to enable quick, independent verification).

III. The tracking service provider returns the newly generated device token to the requesting device, for example by pushing it to the mobile device.

Device tokens are preferably owned by the tracking service provider, which may transfer ownership to another tracking service provider, for example, for reasons of geography or political boundaries. Whichever tracking service provider currently owns a device token will be the one authorized to modify it, such as updating it to indicate current ownership.

When the mobile device receives the device token, is may verify that it contains the correct identifier, such as the proper phone number, and that it was properly signed by the issuing tracking service provider. The token-processing component 170 of the mobile device may also be configured to periodically, or upon user request or upon some other triggering event, poll the tracking service provider associated with each device token it has received to verify its most recent status, such as whether it is still valid, whether ownership has changed, etc. A warning that the status of the mobile device is in a "trigger condition", such as having more than a threshold level of risk, may also be "pushed" from the tracking service provider to the respective mobile device.

Location Token Creation

Figure 3:
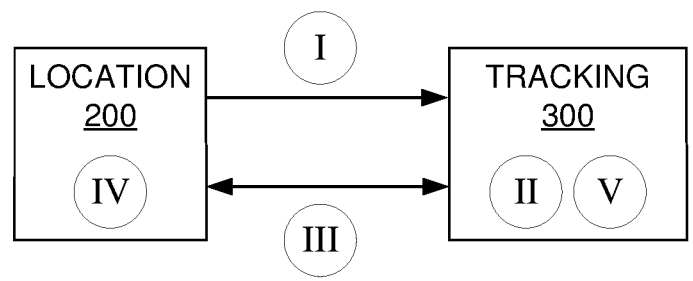

As FIG. 3 illustrates, the process for creating a location token is similar to the process for creating a device token.

I. Whichever person, authority or other entity that owns or controls the location issues a request to the tracking service provider to register the location of the location device 200, for example through a web portal administered by the tracking service provider 300. The tracking service provider then creates a corresponding location token, activates it, and associates it (for example, in the registry 380) with the requesting location.

II. The tracking service provider 300 creates and activates the requested location token and associates it (for example, in the registry 380) with the requesting location device's identifier. Depending on the implementation, the tracking service provider may also include in or at least associate with the token an initial "score" or characteristic, such as a risk or authorization level with the location. In short, the tracking service provider creates the data structure corresponding to the location token and preferably signs it (such as with a KSI signature, to enable quick, independent verification).

III. Either automatically, after II, or upon specific additional request from the location owner/controller, the tracking service provider returns a representation of the location token to the requesting location, with or without the location token data itself. The representation may be in any form suitable for optical scanning, such as a QR code, SnapTag, or other such code, either in the form of a physical marking or tag, or displayed on a screen, or a data set suitable for conversion into electromagnetic transmission as a signal that can be interpreted using Bluetooth, NFC (such as an NFC tag), or other such technology, depending on how mobile devices are to interact with location devices to exchange token information.

IV. The owner/controller of the location device deploys it to the device. This could be as simple as attaching a QR code in physical form to the location, or the location device itself, or storing it in optically scannable form in the location device, or storing the data enabling transmission of the location token in electromagnetic form, or in any other form the system designer chooses for interaction between mobile devices and the location device.

V. The tracking service provider may later update the location token, for example, based on the results of testing or other analysis.

Figure 4:
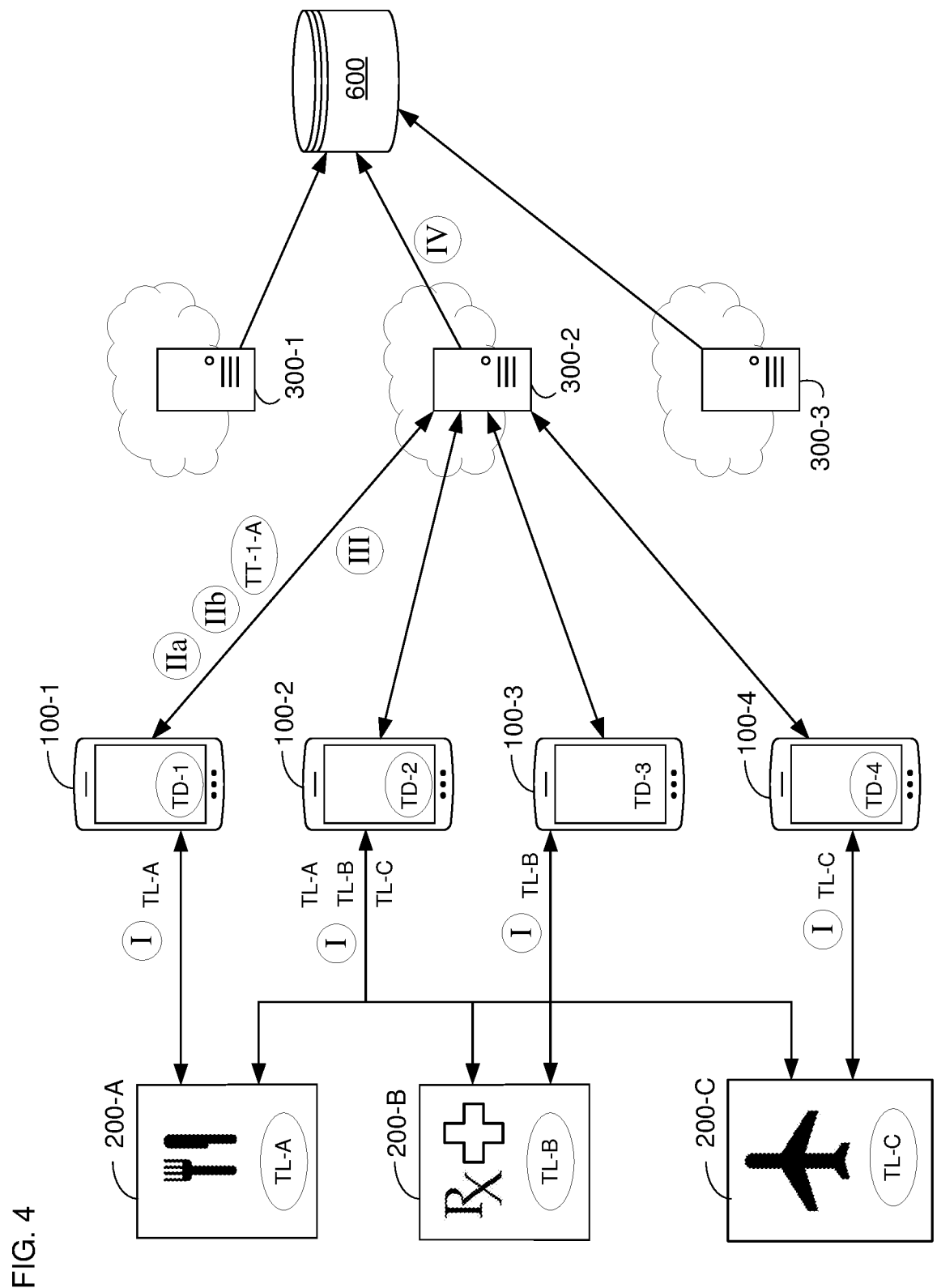

Travel token creation and submission Assume now that a user comes to a location, such that the mobile device senses that it has come into the proximity of the corresponding location device. FIG. 4 illustrates four mobile devices (shown by way of example as smart phones) 100-1, 100-2, 100-3, 100-4 that have been at locations whose location devices are 200-A, 200-B, and 200-C, shown as a restaurant, a medical facility, and an airport, respectively. At this point, each mobile device will have received its respective device token (TD-1, TD-2, TD-3, and TD-4, respectively) and each location device will have a respective location token TL-A, TL-B, TL-C, and TL-D. In the illustrated case, mobile device 100-1 is, or has been, at location 200-A, mobile device 100-2 is, or has been, at locations 200-A, 200-B, and 200-C, mobile device 100-3 is, or has been, at location 200-B, and mobile device 100-4 is, or has been, at location 200-C.

Once a device token and a location token are present, that is, both received by a device, a "travel token" may be created. Depending on the implementation and nature of location devices, these travel tokens may be created either within the location devices, which then issue them to the respective mobile devices, or within the mobile devices themselves, in the corresponding token processing component.

In some implementations, a location token may be transferred, and a travel token created, as soon as the mobile device is in proximity to the respective location device. It would also be possible, however, to make location token transfer conditional. For example, a location token could be transferred only after the mobile device has been in proximity for at least a predetermined minimum time. This might be useful in cases in which brief exposure to something at the location is acceptable, but longer exposure is not. Similarly, this embodiment might be advantageous in cases where a user needs to prove she has been at some location, such as attending an event, for at least some minimum time.

Token transfer and travel token creation may also be made time-dependent in an absolute clock-time sense, that is, on a schedule, so as to enable proof that users were at a location during predetermined time periods. As mentioned, a KSI signature itself encodes time, which may be checked later to determine when a travel token was created, and enable individualized tracking in time. Nonetheless, proximity time may also be established by configuring the location device to issue location tokens only on a schedule, such that creating a travel token based on the location token implies proximity at a scheduled time. Similarly, the token-processing module of a location device could be configured to issue only a limited number of location tokens, at all, or within specified time periods, perhaps with an option to receive and issue more location tokens upon re-authorization by a higher entity, such as the corresponding tracking service provider.

Figure 5:
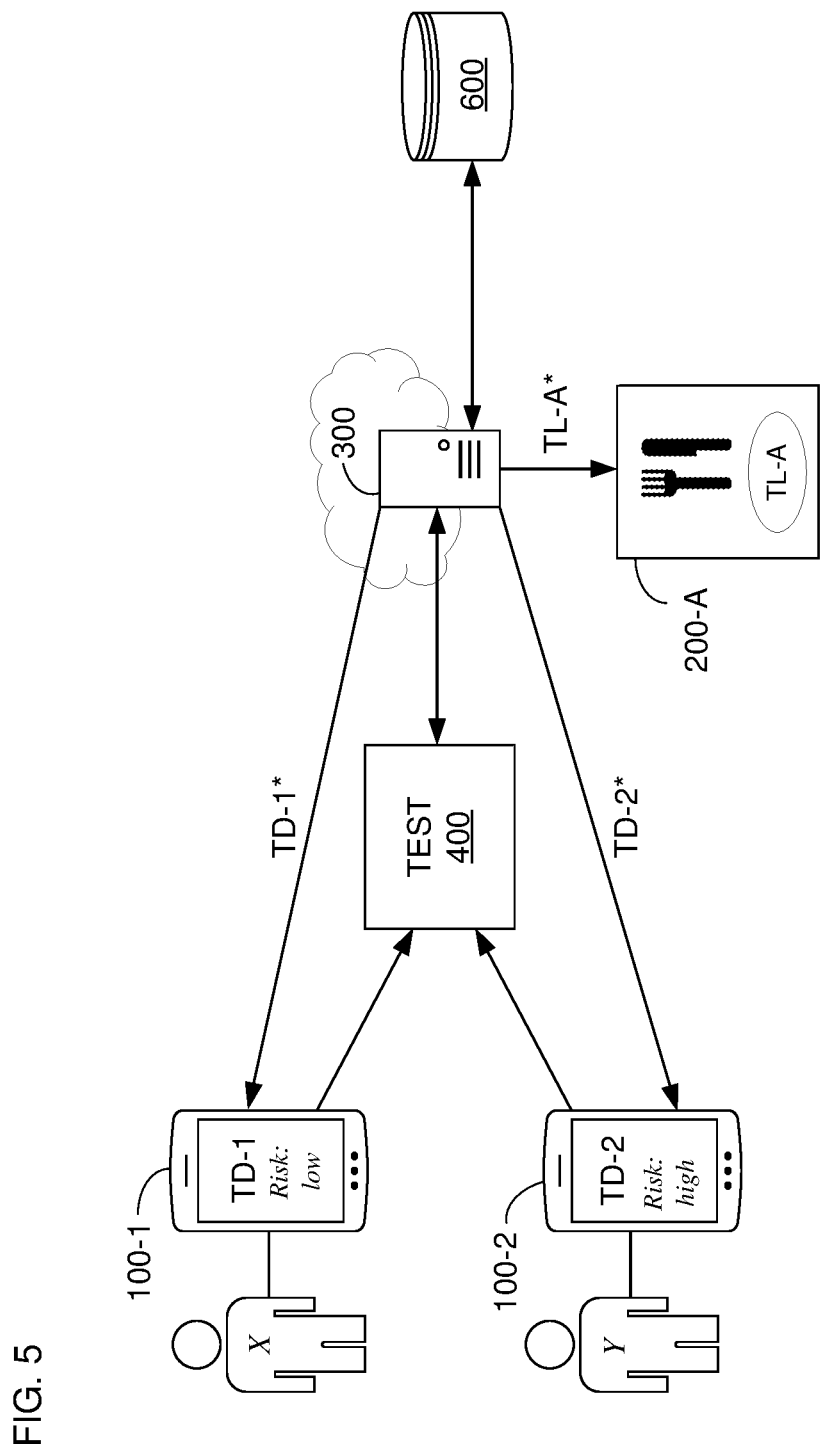

Like other tokens, travel tokens will be data structures or elements and will typically include or encode the location token and device token involved in the interaction, along with, for example, the time of its creation. In FIG. 5, for simplicity, only one travel token is indicated, namely, TT-1-A, indicating that it's the travel token corresponding to the interaction of mobile device 100-1 and location device 200-A. In the illustrated example, there are three tracking service providers 300-1, 300-2, and 300-3, of which only tracking service provider 300-2 is the owner of the tokens for the mobile devices 100-1, . . . , 100-4.

Travel tokens are created and submitted in four main phases, some of which may be optional:

I. A mobile device scans or otherwise inputs the location token of the location where it is. For example, Mobile device 100-1 inputs location token TL-A.

IIa. In some implementations, the mobile device may simply accept the inputted location token as is. Location tokens, and preferably also the device tokens, will in most implementations also have been made verifiable, preferably by having obtained KSI signatures. By using KSI signatures, almost any entity will be able to verify data (such as a token) presented as valid, that is, unchanged. A convenient choice is for the tracking service provider 300 to verify data using signatures, since it will in most cases also be the entity that maintains the registry of tokens. Even an external entity, such as an auditor, may also verify token credentials such as signatures, and even mobile devices and location devices may verify signatures if configured to submit properly formatted verification requests.

In the example shown in FIG. 4, the mobile device 100-1 contacts the tracking service provider that the location token indicates is the current owner of the location token to verify the location token. Such verification may include the tracking service provider confirming proximity of the location token in its registry and verification of the signature of the token, for example, using the techniques described above for verifying a KSI signature.

IIb. The mobile device submits the created travel token for example, TT-1-A, and/or its signature, to the tracking service provider for verification and/or analysis. The tracking service provider may then either verify the token using internal software routines, or by submitting the token for verification by some other entity.

Note that steps IIa and IIb need not occur immediately at the time the mobile device scans the location token, but may be done later, for example, when the owner of the mobile device wants to prove to some authority that the device was at the location.

III. The tracking service provider creates the data structure corresponding to the travel token and preferably obtains a verifiable identifier for it, such as a KSI signature, which the tracking service provider may obtain by communicating a request to the signature system 500. Although it will in many implementations be sufficient for the tracking service provider to store travel tokens, such as in its registry, it may also return the travel token and its signature to the mobile device.

Depending on how tokens are chosen to be structured, the tracking service provider may at this point also be able to determine, based on the location the mobile device was at, that the risk or authorization level of the mobile device and/or the location device may need to be changed. In such cases, the tracking service provider may create and issue new tokens to the respective devices and change its registry accordingly.

IV. The tracking service provider may optionally submit the travel token, either individually or by batch, to yet another system 600 for analysis, such as determination of more wide-spread infection rates and risks. This function could also be performed by the tracking service provider itself, especially in implementations in which there is only one such tracking service provider.

In some situations in which there is more than one tracking service provider, such as illustrated in FIG. 4. It may therefore happen that the tracking service provider that owns a device token but a different tracking service provider owns the location token for the location device that the mobile device is at. In many cases, this may not matter, as long as the tracking service provider that owns the device token associates the location token with the device token in its registry. This is another example of an advantage of using signatures generated by the KSI infrastructure: As long as an entity has the calendar or publication value corresponding to the time of the signature of a token, then it can verify it regardless of which entity owns it. In other implementations, tracking service providers may communicate with each other to exchange information and such that one tracking service provider may request another to confirm the validity of a token that it owns and communicate the determination back to the requesting tracking service provider.

Testing and result sharing FIG. 5 illustrates the following scenario: Two people X and Y report to a test facility, for example, to be tested for some medical condition such as infection. Assume that the current device tokens TD-1, TD-2 for the respective mobile devices 100-1, 100-2 include data elements indicating that the risk for X is low but the risk for Y is high. Assume further that X is tested and it turns out that he does show signs of infection. Not only may this be relevant to more than X's immediate situation, but also to a larger study or basis for policy-making. Moreover, the risk designation low may be inappropriate. Also, assume that the risk designation for Y is high but that, upon testing, she shows no signs of infection. It may then be appropriate to change Y's risk designation as well, depending on other factors.

X and Y present or connect their respective mobile devices 100-1, 100-2 in any known way, wireless or otherwise, to the testing entity 400, and transfer their respective mobile device tokens TD-1, TD-2. The testing entity may then create respective testing tokens TT-X and TT-Y including data about the respective tests such as an ID of the testing entity, the testing method used, and the results, preferably also with a link to the corresponding mobile device token TD-1, TD-2. The testing tokens are preferably signed; again, obtaining KSI signatures for them has the advantage of "built-in" timestamping.

The testing entity 400 may then transmit the test tokens to the tracking service provider, which may they verify both the testing tokens and the corresponding device tokens as desired, and transmit the testing tokens (possibly also with the mobile device tokens) to the analysis system 600 if called for in the implementation.

An example of the combination of tokens is that the testing token could be implemented as a field within, for example, a device token. When a test of a user indicates, for example, positive with respect to a disease, the clinic or other testing authority may give the user's mobile device a unique code, generated in any conventional manner. The user may then enter this code into his mobile device, which triggers the device, via, for example, the proximity sensing module or other software component, to upload all contact-related tokens (for example, location tokens) to a central server, which may also be the tracking service provider or some other authority. This server may then send a message with the location token of the infected party (including no identifying information of the party itself) to all mobile devices with any location token (possibly issued with a time frame) in common with the now known infected user. These users may then themselves decide to or be required to be tested, or to quarantine.

Rules may be applied to the operation of the token-processing component 380 of the tracking service provider to determine whether the risk level (or other characteristic) included in a mobile device or location token should be changed. In the illustrated example, the risk level of X may be raised and the risk level of Y may be lowered or left unchanged. The tracking service provider may do this by creating corresponding updated tokens, passing them to the respective entities, and changing or appending to their register entries to reflect the updates. In FIG. 4, updated tokens TD-1* and TD-2* are thus transmitted to mobile devices 100-1, 100-2. Assuming that the tracking service provider determines, by examining the registry entry for X, that X has presented a location token corresponding to the restaurant 200-A, the risk level of that restaurant may need to be raised, that is, its location token may need to be updated from TL-A to TL-A*, especially if more than some threshold number of users have presented location tokens for the restaurant and have test results indicating infection.

Voluntariness

One advantage of embodiments is that they may be easily adjusted to accommodate needs for varying levels of user privacy, voluntariness, and centralization. The concepts of privacy and voluntariness will often be related, in that a lack of compulsion will generally correlate with a greater ability of the user to maintain privacy. For example, in the description above, it is assumed that users enable their respective mobile devices to interact with location devices. This may be totally voluntary, but could also be made less so, for example, by programming into the mobile device, such as into the proximity or token processing software, a requirement to obtain at least one new location token in some time period in order for some other phone function to be enabled. In mobile devices that are built into some other system, such as mobile Internet of Things components, it would also be possible to install the software components that implement the invention at the system level, that is, at a level that the user cannot easily bypass.

In some embodiments, especially those in which user privacy is particularly important, mobile devices could store location and/or travel tokens, until the user chooses to transfer them to a tracking service provider, possibly after being prompted such as by an sms message, by an administrator, or possibly upon receiving notification that he has tested positive for an infection. In short, the storage of location tokens and uploading them to a tracking service provider may be made decentralized to the mobile devices.

Decentralization

Embodiments also lend themselves well to different degrees of decentralization. Even some aspects of token analysis may be at least partially decentralized. For example, the token-processing module 170 in a mobile device 100 may be configured to analyze location tokens that it has stored to determine a risk level. For example, if the mobile device may be configured to display a risk or warning level, or an "alarm" notification, if it has input at least some threshold number of location tokens from locations that have individual or accumulated risk scores that are above chosen limits. Such an "alarm" or display could then be the notice or suggestion to the user to transmit the location tokens to a tracking service provider. Such voluntary upload could also be made selective: The token-processing component (for example) could display a list of stored location tokens and the user may then select which ones to report (along with the mobile device token or a function of it, such as a hash) to the tracking service provider. A user may wish, for example, to report only those from locations with high risk scores, or that are more recent, or according to some other selection criteria.

Before uploading all or selected tokens from the mobile device, the user may be required to take some action such as tapping a "submit" icon or button, or actively enter some login or other information, etc. This action may be taken as consent to share the potentially personal information, and a representation of this consent action may be signed, for example, using the KSI infrastructure. This signature, along with a user identifier (and/or the mobile device token) may then also be required to be submitted to, for example, the tracking service provider, and may thus form proof of consent, which may be required under schemes such as the General Data Protection Regulation (GDPR).

In implementations such as the tracking of an infection, users are tracked primarily with respect to a single, common factor, that is, the risk or fact of infection. These implementations will typically require some level of centralization to be able to keep track of "hot spots" or particular "positive" individuals.

In other implementations, however, there may be more than one or even individualized factors to be tracked with respect to proximity, and there may be no need for central analysis. In such cases, location devices may generate their own location tokens; mobile devices could do the same. As just one simple example, the mobile and location devices could generate per-instance tokens based on (for example, by hashing) random numbers and unique identifying information from the devices, or may simply create respective tokens from a standard set of data fields to include, for example, ID, but with a time indication.

It would also be possible to use a KSI signature as a token, with the device ID (and any other desired parameters) as elements of an input record: The mobile device could get a KSI signature for its input record, thereby creating a time-stamped token, and the location device could do the same. This token-creation mechanism could be synchronized, such that the mobile device and location device, as part of their communication protocol, submit signature requests during the same KSI calendar period, such that their token signatures have the same calendar value, which might then itself form a travel token for the mobile device. Alternatively, the signatures of the separate tokens could themselves be signed, with the combined signature forming, or forming part of, the travel token.

In such a decentralized embodiment, in which devices generate their own tokens, there need not be an assumption of mobile device vs location device; rather, each device could comprise the "location device" for the other, with each device creating a respective travel token, or sharing a commonly generated (for example, KSI signed) travel token, which each could store for later presentation or uploading to any entity that wishes to verify and/or analyze.

In some other situations, it may not be necessary for any other entity to know the identity of the mobile device that wishes to create a travel token; rather, it may be sufficient for the mobile device to obtain a location token and then to create a corresponding travel token based on a received location token and its own internal mobile device token. To improve later verifiability, it may then be preferable for the mobile device to transfer to the location device at least some anonymized version (such as a hash) of its ID to the location device, or a copy of the travel token it creates. Along with the location token, the location device may also send to the mobile device a copy of the location token's time-stamped digital signature (such as a KSI signature), which the mobile device may then be required to store along with the travel token, or to incorporate into the signature request it makes for the travel token.

Interaction Representation

An administrator-level entity such as a tracking service provider or the analysis system 600 may wish to compile and make available either generally or for specific parties (including mobile device users) either a general or user-specific representation of the interactions between mobile device(s) and locations. To this end, the administrator-level entity may maintain a database that tracks each user-location interaction, or some filtered subset of these interactions. For each interaction, for example, corresponding to the creation of each travel token, this database may store fields that indicate some representation of the identity of the user or user device (or simply maintain a count), or the location, of the time, and of the risk (or other tracked characteristic) level of either the user, the location, or both. Entries may also be weighted, such as with a time decay parameter for the user and/or location, or according to some other characteristic of the user, such as age, weight (for example, for obesity studies), etc. This information may then be represented in any chosen format. As one example, the information relating to a location for different users may be combined to create a composite "score", which may also be made time-dependent. Time information may, for example, be easily extracted from KSI signatures of the travel tokens, or otherwise, depending on what signature method is used. This could then be displayed as a graph, with each location forming a node. This graph could also be correlated to actual geographic position, thereby creating a "risk map".

The invention claimed is:

1. A method for verifying proximity between two devices comprising:
in a mobile device:
sensing proximity to a location device;
obtaining a mobile device token, said mobile device token being a first data structure that includes an encoding of an identifier of the mobile device; and
at an interaction time, inputting from the location device a location token, said location token being a second data structure including an encoding of an identifier of the location device;
generating a travel token as a digital combination of the mobile device token and the location token, as well as a interaction time indication, said location token being created by and allocated by a tracking service provider to the location device;
transmitting the travel token to the tracking service provider; and
obtaining a first digital signature for the travel token;
said mobile device token being created by and allocated by a tracking service provider to the mobile device;
said mobile device token including an indication of a risk level.

2. The method of claim 1, in which the travel token is created by the mobile device.

3. The method of claim 1, further comprising the mobile device receiving the travel token from the location device, in which the travel token is created.

4. The method of claim 3, said mobile device token including an indication of a time-limited validity.

5. The method of claim 1, said mobile device token being generated and assigned to the mobile device by a tracking service provider, whereby obtaining the mobile device token comprised inputting the mobile device token from the tracking service provider.

6. The method of claim 1, further comprising receiving from the tracking service provider a warning that a status of the mobile device is in a trigger condition.

7. The method of claim 1, in which control of the mobile device token is transferrable between a plurality of tracking service providers.

8. The method of claim 1, further comprising the mobile device obtaining from the tracking service provider an update of the status indication and including the update in the mobile device token, after an initial allocation of the mobile device token.

9. The method of claim 1, in which the status indication indicates which of a plurality of tracking service providers controls the mobile device token.

10. The method of claim 1, in which the location token has a time-limited validity.

11. The method of claim 1, further comprising obtaining the first digital signature by submitting the travel token as at least one parameter of an input record to a hash tree infrastructure, in which the first digital signature comprises a vector of sibling values enabling recomputation upward through the hash tree infrastructure to a first calendar value that is synchronized with time and represents an uppermost value of the hash tree infrastructure at a corresponding first calendar time, said first digital signature thereby encoding the both the mobile device and location device identity elements, as well as the first calendar time;
whereby a purportedly authentic representation of the travel token may be subsequently verified as being valid if, upon recomputing a hash tree path represented by the sibling values, from the purportedly authentic representation of the travel token through the hash tree, the same uppermost value is obtained as is contained in the first digital signature.

12. The method of claim 11, further comprising obtaining a second digital signature for the mobile device token by submitting the mobile device token as at least one parameter of a second input record to the hash tree infrastructure at a second calendar time.

13. The method of claim 11, comprising obtaining the mobile device token as a second digital signature obtained by including the identifier of the mobile device as at least one parameter of a second input record to the hash tree infrastructure at a second calendar time.

14. The method of claim 11, in which the mobile device token is a digital signature obtained from the hash tree infrastructure.

15. The method of claim 1, in which the location device is non-stationary.

16. The method of claim 1, in which sensing proximity to the location device and inputting the location token comprises optically scanning a marking at the location device.

17. The method of claim 1, in which sensing proximity to the location device and inputting the location token comprises wireless data transfer from the location device.

18. The method of claim 1, further comprising inputting the location token only after the mobile device has sensed proximity to the location device for at least a minimum proximity time.

* * * * *